E. M. WHITNEY.
SACK FILLER AND PACKER.

No. 182,377. Patented Oct. 3, 1876.

WITNESSES:
H. Rydquist
John Goethals

INVENTOR:
E. M. Whitney
BY
[signature]
ATTORNEYS.

UNITED STATES PATENT OFFICE.

EDWARD M. WHITNEY, OF BATAVIA, NEW YORK.

IMPROVEMENT IN SACK FILLER AND PACKER.

Specification forming part of Letters Patent No. 182,877, dated October 3, 1876; application filed June 6, 1876.

*To all whom it may concern:*

Be it known that I, EDWARD MORTON WHITNEY, of Batavia, in the county of Genesee and State of New York, have invented a new and Improved Sack Filler and Packer, of which the following is a specification:

My invention consists of a follower-valve in the spout or nozzle of a funnel, or equivalent-shaped hopper or bin, containing flour or other like substance to be packed, which is made to rise up and let the flour descend into the sack, the mouth of which is attached to the funnel, and then close over and press down the desired quantity of flour into the sack, shutting the spout against the further escape of the flour while the filled sack is removed and an empty one put on, the contrivance being such that the quantity of flour can be varied at will for sacks of different sizes.

My invention also comprises an adjustable platform for holding the bags when filling and pressing, in combination with the filling apparatus, all as hereinafter described.

Figure 1:
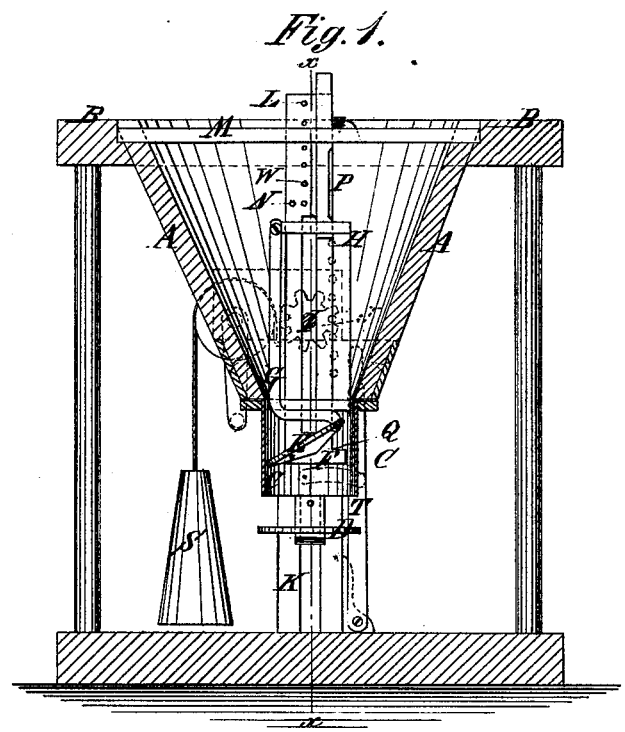
Figure 2:
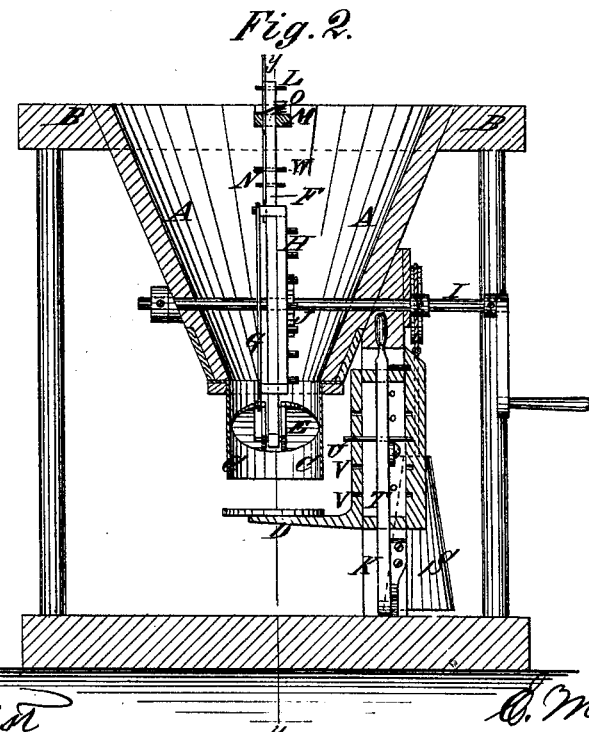

Figure 1 is a sectional elevation of my improved filler and packer, taken on the line $yy$ of Fig. 2, and Fig. 2 is a section on the line $xx$, Fig. 1.

Similar letters of reference indicate corresponding parts.

A is the bin or hopper, into which the flour or other substance to be packed is delivered, said bin or hopper being suspended from the floor B, or any suitable support, and having a spout or nozzle, C, at the bottom, to be inserted in the mouth of the bag to be filled, which rests on the vertically-shifting platform D, by which the bottom of the bag is supported nearly up to the end of the spout.

E is the follower and valve for separating the quantity to be packed in the bag from the store above, pressing it into the bag, and retaining the rest while changing the bags. It is pivoted to the bar F, and connected, by rod G, with another slide, H, which slides up and down on bar F, being worked by the crank-shaft I and pinion J, arranged in the hopper so as to gear with said bar and be turned by the crank outside. The bar F is also made to rise and descend by the crank and pinion, which first open or close the follower-valve according to which way they are turned, and then, through their connection with the bar F, operate it for raising the valve up the required distance, to enable it to cut off the amount of flour it is desired to let into the bag, and then to press it in, the quantity being regulated by the position of the pin W in the bar F under the cross-bar M, which limits the distance which the follower is raised—and this regulates the quantity.

A pin, N, regulates the opening of the valve, and causes slide H to lift bar F as soon as the valve opens; and pin L, above the bar M, stops the downward movement of bar F, to limit the distance the flour is pressed into the bag. A spring-catch, O, on the cross-bar M holds the bar F against descending until the valve closes, when it is tripped by the incline P of a small bar extending up through bar M from slide H.

The lower end of slide H arrives against the foot Q of bar F at the moment the valve closes, and it also bears against the valve, so that the whole power of the hand-crank is applied to the pressing of the flour into the bag. Bar F has a slot through which the crank-shaft is arranged as a lateral stay to the lower part.

The platform D, on which the bag rests, is fixed to rise and fall on the vertical ways K, and has a weight and cord, S, to raise it up to the bag when it is put on the spout C, and it also has a stop-lever, T, and pin U, to lock it at the required height, by engaging the pin with notches V in the part of the platform sliding on the ways K. The quantity of flour is mainly regulated by varying the height of the platform by the stop-lever.

Pins are used on the slide H for the teeth of the pinion to avoid clogging, as ordinary teeth would.

Having thus described my invention, I claim as new and desire to secure by Letters Patent—

1. The vertically-sliding bars F and slide H, crank-shaft I, pinion J, and the valve E, combined with the hopper A and spout C, substantially as specified.

2. The valve E, pivoted on the vertically-sliding bar F, and connected, by rod G, with the slide H, sliding on bar F, and geared with the crank-shaft, substantially in the manner described.

3. The spring O and trip-bar P, combined with bars F and slide H, substantially as specified.

4. The vertically-adjusting platform D, with its weight S, stop-lever T, and pins U, combined with the filling and pressing apparatus, substantially as specified.

EDWARD MORTON WHITNEY.

Witnesses:
MARY E. WHITNEY,
LAURA E. BOOTH.